United States Patent

[11] 3,581,679

[72] Inventors Peter Jansen;
 Wolfhard Erling, both of Villingen, Black Forest, Germany
[21] Appl. No. 780,372
[22] Filed Dec. 2, 1968
[45] Patented June 1, 1971
[73] Assignee Fr. Winkler Kg, Spezialfabrik Fur Backereimaschinen und Backofen

[54] OVEN APPARATUS
 8 Claims, 5 Drawing Figs.
[52] U.S. Cl. .................................................. 107/63
[51] Int. Cl. ...................................................... A21b 1/24
[50] Field of Search .......................................... 107/57, 63

[56] References Cited
 UNITED STATES PATENTS
 2,240,291 4/1941 Engels .......................... 107/63
 2,783,720 3/1957 Skarin et al. .................. 107/63
 2,908,235 10/1959 Naylor et al. ................. 107/63
 3,332,372 7/1967 Royer .......................... 107/57

Primary Examiner—Louis K. Rimrodt
Attorney—Howson and Howson

ABSTRACT: In an oven apparatus for baking food products including an oven chamber or cavity defined in part by a pair of spaced parallel liners or walls defining the floor and top of the oven chamber, a pair of heating systems providing both radiative and conductive heating of the air in the heating channels. The first heating system includes a plurality of longitudinally extending heating channels adjacent to and disposed exteriorly of the liners forming the top and floor of the oven chamber and means for circulating hot gases through the heating channels. The second heating system includes a plurality of air channels between adjacent ones of the heating channels and coplanar therewith, means defining a plurality of orifices whereby air is circulated through the heating channels and through the oven chamber or cavity. Preferably, the channels are formed by corrugated or meandering members made of a heat conductive material so that the cross section of the heating channels is trapezoidal with its larger base confronting the oven cavity, the slanting sides of the corrugated member providing a common wall dividing the heating channels and the air channels. This arrangement provides an oven which, while compact, nevertheless provides both radiative and conductive heat of the air in the oven cavity as well as convection flow through it.

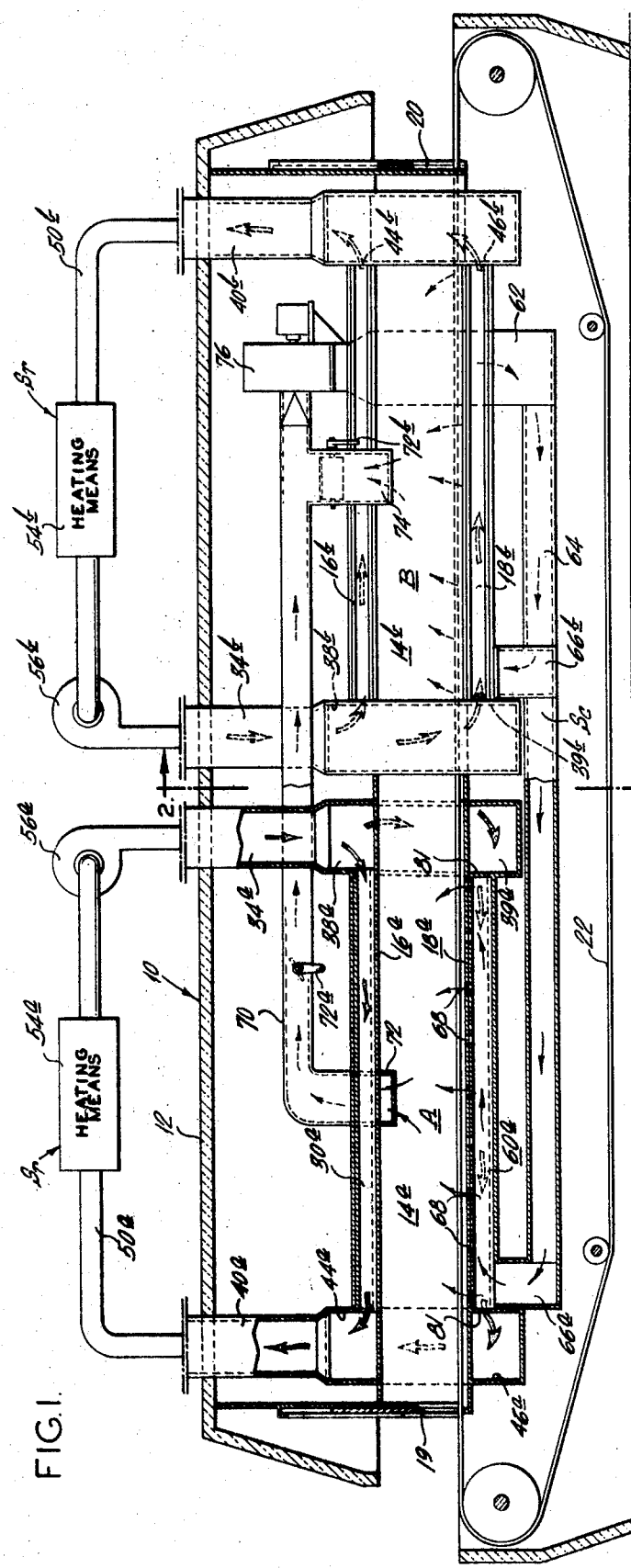
FIG. 1.
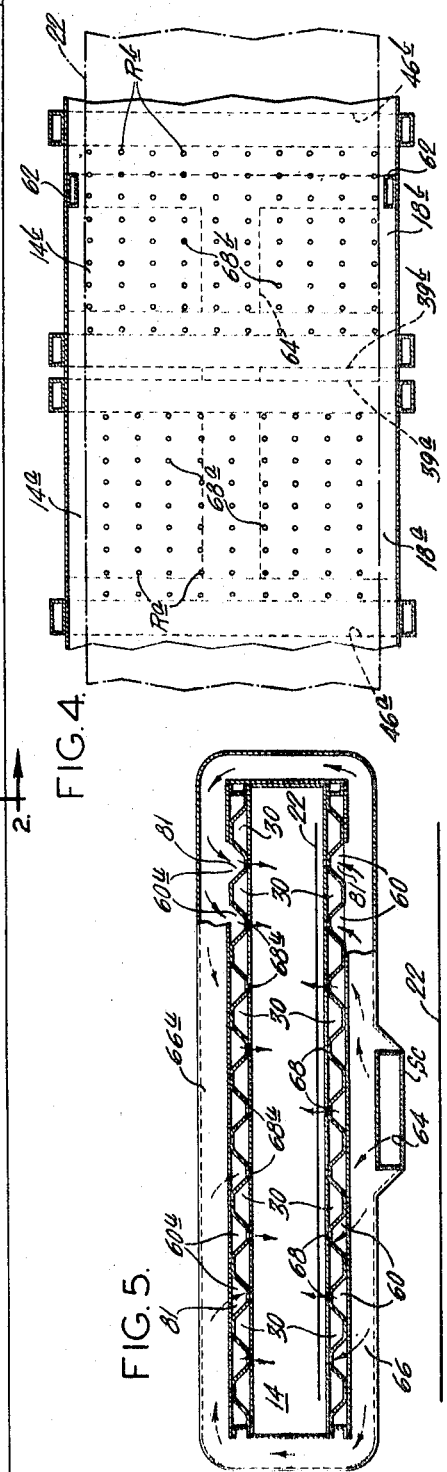
FIG. 4.
FIG. 5.
INVENTORS:
PETER JANSEN
WOLFHARD ERLING
BY Howson & Howson
ATTYS.

3,581,679

INVENTORS:
PETER JANSEN
WOLFHARD ERLING
BY Howson & Howson
ATTYS.

OVEN APPARATUS

This invention relates to oven apparatus and particularly to such apparatus suitable for use in the baking of food products in large quantities.

In designing a baking oven and its associated heating system, it is important to consider the types of heat transport to be provided and, in particular, the relative proportions of heating which are to be provided by radiation, by conduction, and by convection.

Various types of ovens are available which have one or more drawbacks or disadvantages which the present invention is designed to overcome. For example, there are indirectly heated ovens having a stationary atmosphere in the baking chamber wherein the heat is propogated mainly through radiation and only a small portion through conduction. Aside from the normal or natural movement of air within the baking chamber, there is no convection so that the portion of convection heat available within the baking chamber is negligibly small.

There are also in the prior art, gas ovens heated directly by gas burners wherein the heat spreads through radiation and to some extend through convection.

There are also baking ovens wherein the air in the baking chamber is moved by the aid of fans or blowers and is heated by means of heat exchangers or the like. In these ovens, the transfer of heat to the product being baked is mainly through convection, the same applying to ovens wherein the combustion gases are conducted directly into the baking chamber.

The present invention relates to circulating baking ovens wherein the baking chamber is indirectly heated by means of radiator means or the like, wherein the heat transfer is effected almost exclusively through radiation. These radiators, which are usually set below or above the baking chamber, consist of flat hollow elements that can be supplied with heated gas or similar heating medium. The purpose of the present invention, in the case of such ovens heated by radiators, is to increase the proportion of convection heat in the baking chamber, for the purpose chiefly of in this way increasing the efficiency of the oven and of enlarging the possibilities for using it.

In some instance in ovens of this type a hot air is circulated through the baking chamber atmosphere to improve the transfer of heat by convection. These ovens, however, are comparatively bulky and not very efficient by reason of the particular construction and arrangement of the heating system. For example, in these ovens there is usually disposed inside of the baking chamber above and below the liners, pipes conducting hot gases and secondary circulating system having nozzles with outlets into the baking chamber which blows air against the pipes. These air distributors are usually made as flat boxes provided with inlet nozzles which are separated spatially from the hot gas conducting pipes thereby necessitating a relatively high baking chamber and this is undesirable when the oven is used as a pure radiation oven.

The present invention provides an improvement in circulating baking ovens which overcomes the disadvantages and drawbacks of various types of ovens discussed above and which is characterized by novel features of construction and arrangement providing a compact oven and one wherein the efficiency is greatly increased. Thus, the oven apparatus includes a plurality of side-by-side channels disposed in a common plane above and below the baking chamber. Alternate channels are termed "hot gas" channels or radiators through which a heated fluid medium such as hot gases are circulated and channels intermediate the gas channels are termed "air" channels through which hot air is circulated into the baking chamber through orifices in at least the liner forming the floor of the oven chamber. Thus, the hot gas channels or radiators and the air channels, through which is circulated into the baking chamber, the hot air serving for convection, are disposed directly adjacent one another in one plane. In this manner the baking chamber can be approximately the same height as a normal indirectly circulating baking oven. Another substantial advantage is that the radiators can serve as heat exchangers for heating the air that is circulated through the oven chamber. In the preferred form of the invention, the hot gas channels and air channels are formed by an undulating or corrugated web made of heat conducting material arranged in such a way that the air channels have a triangular cross section with the apex pointing toward the baking chamber and the hot gas channels intermediate the air channels are of trapezoidal cross section with the larger base confronting the baking chamber. By this arrangement, the slanted walls forming a common dividing wall between adjacent air and hot gas channels provide maximum heat exchange to heat the air in the air channels. Furthermore, since the hot gas channels have their maximum enlargement at the side turned toward the baking chamber, radiation of heat into the baking chamber is optimized to achieve good heat transfer by radiation.

Even though a preferred arrangement of the side-by-side air and hot gas channels has been described above, other forms of coplanar arrangement are equally suitable. Thus, the cross section can be in the form of a circle, and ellipse, a triangle or of a square or some other polygonal shape. From the constructional point of view and also for the transfer of heat for the two systems it is advantageous to provide a web member made of a conductive material which defines the channels and to dispose the radiator surfaces angularly whereby the outlet nozzles for the conduction air are disposed in the region of the air channels at the baking chamber side and through walls of the air channels in the region of the top. The nozzle configuration and arrangement for circulating heated air through the baking chamber may comprise parallel rows extending longitudinally of the baking chamber or other arrangements. For example, if it is used for an oven that has a conveyor belt or the like, a netting belt for example, that transports the goods being baked through the baking chamber, then the outlet nozzles, in the direction in which the baked goods are conveyed, can be offset laterally, preferably by a half-space each time, by zones when a number of zones follow one another. Through this, uniform heating of the baked goods transported through the baking chamber is obtained.

The present invention provides an improvement in a circulating oven by effecting heat transfer through convection in contrast with previously known circulating bake ovens wherein the heat transfer is effected almost exclusively through radiation. This provides several substantial advantages. For example, by increasing the proportion of convection heat, the efficiency is greatly improved. Improved efficiency can be used to shorten the baking time, increase the output or for lowering the temperature of the hot gases that are used in the hot gas circulating channels.

Furthermore, the circulation of the hot air can be regulated and controlled to adapt the oven to varying requirements. For example, in the baking of bread in pans, it is desirable to increase the proportion of convection heat simply by increasing the circulation of hot air circulated through the hot air channels. On the other hand, in baking bread standing by itself, the flow of hot air can be throttled down to simulate a traditional circulating baking oven. To this end the circulation of the hot air and the circulation of the hot gas can be regulated independently of one another.

Additionally, with the oven of the present invention, the heat transfer can be shifted from primarily convection to primarily radiation and vice versa to facilitate rapid change over from one kind of baking operation to another. In this connection the ability to regulate the oven is improved since the individual hot air nozzles are controlled independently from one another as respects their output and/or the direction of the jet. Further, by means of the present invention, the distribution of heat inside the baking chamber is made uniform.

These and other objects of the present invention and the various features and details of the operation and construction thereof are hereinafter more fully set forth with reference to the accompanying drawings, wherein:

FIG. 1 is a longitudinal sectional view through a circulating baking oven incorporating a heating system in accordance with the present invention;

FIG. 4 is a fragmentary plan view showing the air discharge nozzles in staggered relation in the adjacent zones of the baking chamber; and FIG. 5 is a sectional view of a modification wherein the combined heating systems are employed above and below the baking chamber.

Figure 2:
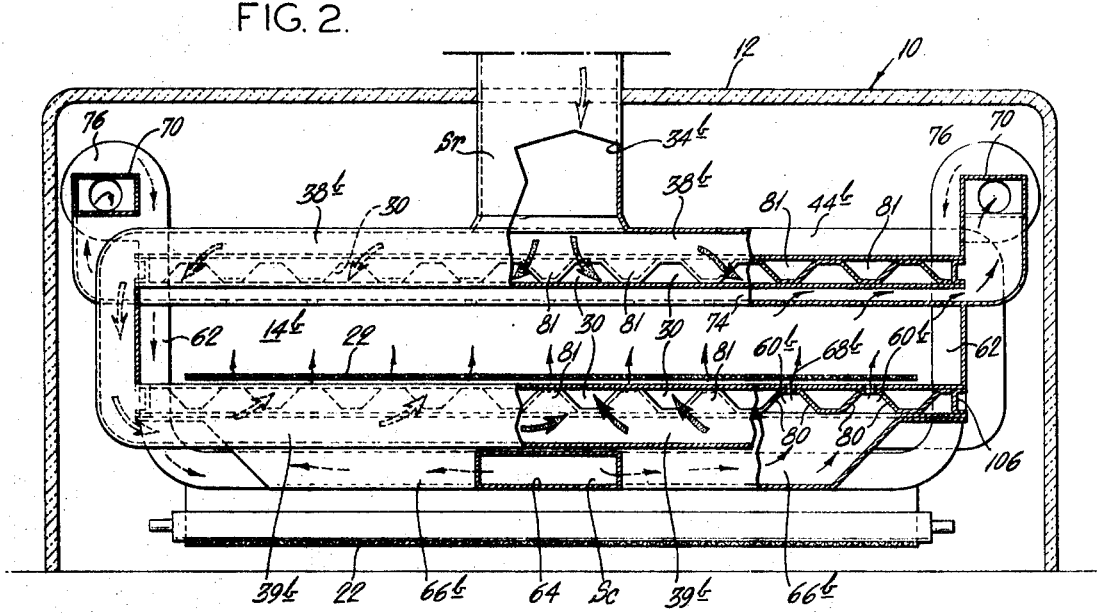
FIG. 2 is an enlarged sectional view taken on lines 2-2 of FIG. 1.

Referring now to the drawings and particularly to FIGS. 1 and 2 thereof, there is shown a circulating baking oven generally designated by the numeral 10 incorporating a heating system in accordance with the present invention. The oven comprises an exterior housing 12 and a baking chamber or cavity 14 of generally rectangular cross section, the top and bottom walls of which are defined by elongated spaced apart upper and lower liners 16 and 18. The oven chamber has inlet and discharge openings 19 and 20 at opposite ends thereof which may be provided with doors to seal off the baking chamber 14 during the baking cycle. Goods to be baked are transported through the oven chamber by means of a foraminous endless belt type conveyor 22 supported on pulleys for movement in an endless path and actuated by suitable drive means not shown.

In the present instance the oven is divided approximately centrally thereof into two adjacent compartments or zones A and B. It is noted, however, that in some instances the baking chamber 14 may comprise a single zone and thus some of the elements of the heating system may be integrated.

In accordance with the present invention means is provided for heating the oven chamber comprising in the present instance a first heating system broadly designated $S_r$ for producing almost exclusively radiated heat and a second heating system broadly designated $S_c$ for producing heat by convection. In the present instance, some of the elements of the heating systems for the zones A and B are identical and these elements are designated in the drawings by the same reference numeral and distinguished by a letter subscript, "$a$" for zone A and "$b$" for zone B.

In the drawings, flow of fluid or gaseous medium through the radiation system $S_r$ is represented by the stippled arrows, and flow of air through the convection heating system $S_c$ is represented by plain arrows. The first radiation heating system $S_r$ includes a plurality of longitudinally extending radiators in the form of "hot gas" channels 30 disposed above and below the upper and lower liners of the baking chamber. The channels 30 are of a configuration whereby the largest side thereof confronts the baking chamber to provide maximum radiation heating of the baking chamber. Means is provided for circulating a heated fluid medium for example, hot gas through the channels 30 which includes a conduit system including in the present instance two supply shafts $34_a$ and $34_b$ disposed adjacent the juncture of the zones A and B, the supply shaft $34_a$ and $34_b$ communicating with inlet manifolds $38a$, $39_a$ and $38_b$ and $39_b$ at one end of the channels $30_a$ and $30_b$ and discharge shafts $40_a$ and $40_b$ communicating with discharge manifolds $44_a$, $46_a$ and $44_b$, $46_b$ at the opposite ends of the heating channels 30. The supply and discharge shafts are connected in a closed circuit by connecting ducts $50_a$ and $50_b$, each of these ducts, in the present instance includes separate heating means $54a$ and $54_b$ and separate fans $56_a$ and $56_b$ for circulating the heating fluid, hot gases, in the direction indicated by the stippled arrows in FIG. 1. It is noted that a common heating means and fan may be employed for circulating the hot gases through the radiation system $S_r$ in both zones. Further it is apparent where the oven has only one zone, only one heat source and fan are required.

By this arrangement the hot gases emitted from the supply shafts $34_a$ and $34_b$ flow in the direction of the stippled arrows into the inlet manifolds and through the heating channels 30 or radiators. The circulating fans $56_a$ and $56_b$ draw the gases through the collector manifolds, discharge shafts and the heating means $54_a$ and $54_b$ and, after being heated, the gases are again returned to the supply shafts for recirculation through the system. During flow of the hot gases through the heat channels 30, the hot gases emit part of their heat chiefly through radiation into the oven chamber.

Figure 3:
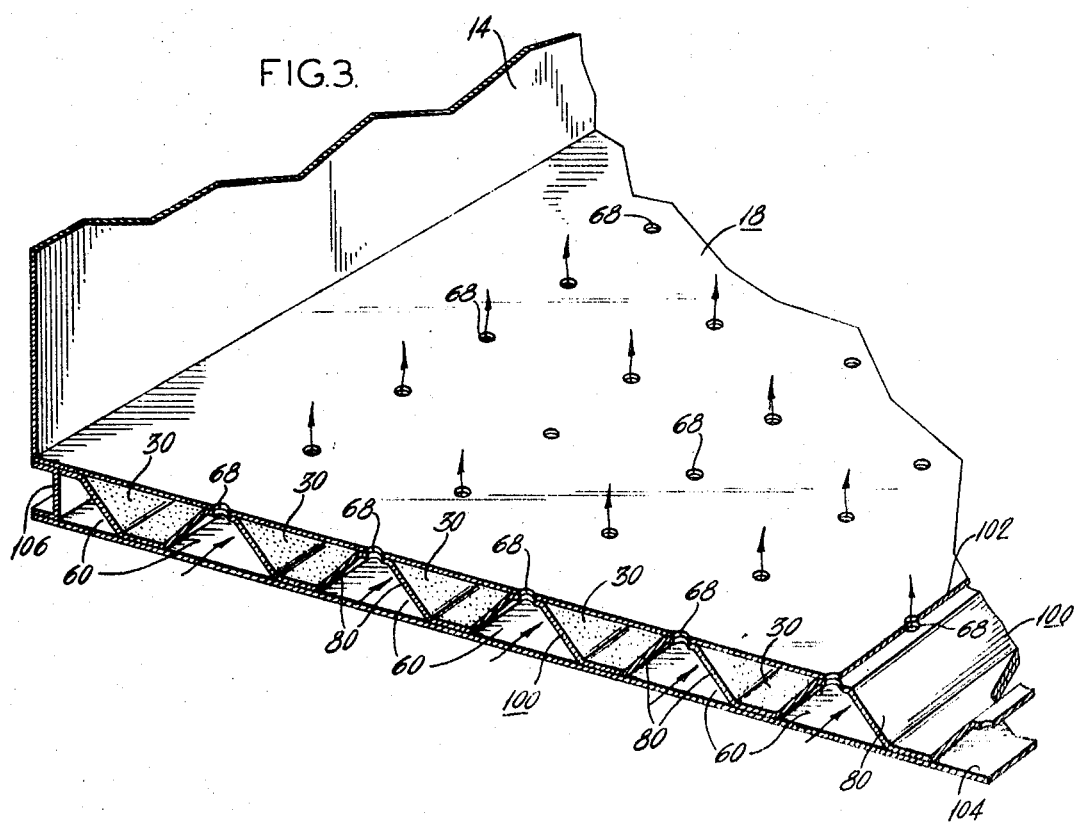
FIG. 3 is a fragmentary perspective view showing the orientation and arrangement of the hot gas and air channels of the heating system.

The second convection heating system $S_c$ includes a plurality of longitudinally disposed air channels 60 intermediate the hot gas channels 30. These air channels 60 are preferably disposed in alternate relation to the hot gas channels 30 in coplanar relationship therewith as illustrated in FIG. 3. In the oven apparatus shown in FIGS. 1 and 2, air channels 60 are provided above and below the upper and lower liners of the oven cavity. However, in this embodiment air is only circulated through the air channels 60 below the lower liner 18. The arrangement for circulating air through the channels $60_a$, $60b$ includes an air supply shaft 62, a longitudinally extending duct 64 running approximately the length of the oven chamber communicating with two manifold sections $66_a$ and $66_b$ for delivering the circulated air to one end of the air channels 60 in each zone and effecting circulation in the manner indicated by the arrows. The air channels 60 communicate directly with the bake oven chamber in the present instance by means of a plurality of orifices 68 in the upper and lower liners of the oven chamber whereby air is circulated directly into the oven chamber 14 from the air channels 60. The hot air discharged from the orifices 68 is drawn through the chamber 14 through a return duct 70 having depending legs 72 and 74 opening into the oven chamber. A circulating fan 76 is provided in the return duct 70 to deliver the air to the supply shaft 62.

As best illustrated in FIG. 2, the air channels $60a$ and $60_b$ in each of the zones A and B have end closure walls 81 to insure independent flow through the hot gas and air channels in the manner described above.

The orifices 68 are aligned in longitudinally extending rows $R_a$ and $R_b$ in each zone. The rows $R_a$ and $R_b$ may be aligned or staggered relative to one another in the manner shown in FIG. 4 if desired. By staggering the rows, uniform heating of the baked goods transported through the oven chamber 14 is obtained.

A slight modification of the convection heating system $S_c$ is illustrated in FIG. 5. In this instance, air channels $60_u$ are provided intermediate the gas channels 30 above the oven chamber and in order to circulate air through these channels, the manifold sections $66_a$ and $66_b$ are enlarged to include upper extension $66_u$ to communicate with the air channels in the manner shown in FIG. 5. Additionally as illustrated, orifices $68_u$ are provided in the upper liner communicating with the air channels $60_u$ and the oven chamber 14. The orifices $68_u$ are disposed in rows which may be aligned with the rows $R_a$ and $R_b$ or may be staggered relative thereto.

Preferably the hot gas channels 30 and the air channels 60 are oriented in alternating side by side relation as shown in FIG. 3 and the hot gas channels 30 are of a trapezoidal shape or configuration with the broader base confronting the oven chamber and the hot air channels 60 are of a triangular configuration with the apex facing the oven chamber. By this arrangement the surface effected for heat radiation confronts the baking space whereby there is effective radiation across the entire width of the top and bottom wall of the chamber. Moreover, by this arrangement there is a large surface area of the gas channels in direct confrontation with the air channels to promote the greatest heat transfer for heating the air circulated through the air channels.

In the preferred arrangement the air and hot gas channels are defined by a web 100 of a meandering or corrugated configuration made of a material having a high heat-conducting value, for example, sheet metal. The web 100, as illustrated, is mounted between the upper and lower liners 16 and 18 and plate members 102 and 104 spaced respectively from the upper and lower liners. The opposite sides of the hot gas and air channel assembly are closed by U-shaped channel members 106.

The configuration of the web 100 thus defines air channels of generally triangular cross section having their apex confronting the oven chamber 14, the orifices 68 extending through the apex and hot gas channels 30 of trapezoidal cross section wherein the larger base confronts the oven chamber 14. Thus, the greatest radiative effect from the hot gas channels is provided notwithstanding the fact that air channels are disposed between the hot gas channels. Further, the slanting web portions 80 which define the common dividing wall between adjacent hot gas and air channels promotes an exchange of heat between the gases in the hot gas channels 30 and the air in the air channels 60 serve to heat the air circulated through the air channels 60.

It is noted that within the frame work of the heating systems described, heating conditions within the oven chamber may be selectively varied. For example, rate of flow of the air through the convection heating system may be controlled by the recirculating fan 76 which may be operated by a variable speed drive source and circulation through each zone may be varied by simply regulating the dampers 72$_a$ and 72$_b$. Additionally, the heating means 54$_a$ and 54$_b$ may be of the selectively variable type to vary the temperature of the circulating hot gases and the fans 56$_a$ and 56$_b$ may be also driven by variable speed motors for example.

While particular embodiments of the present invention have been illustrated and described herein, it is not intended to limit the invention to such disclosure and changes and modifications may be made within the scope of the following claims.

I claim:

1. Oven apparatus comprising means defining an oven cavity including a pair of spaced apart walls, a plurality of side-by-side coplanar channels disposed exteriorly of said oven cavity adjacent at least one of said oven walls in heat exchange relation therewith, alternate ones of said channels being heating channels and the channels between the alternate ones air channels, means defining a plurality of orifices providing communication between the air channels and the oven cavity, means for circulating air through said air channels and through said oven cavity to provide for convection heating of said oven cavity and means for circulating a heated gas through said heating channels to provide for radiant heating of said oven cavity.

2. Oven apparatus as claimed in claim 1 including heating means mounted exteriorly of said oven cavity on at least one of said oven walls and wherein said air recirculation means comprises an air recirculation system for withdrawing air from said oven cavity and passing it again over said heating means and thence back to said oven cavity.

3. Oven apparatus as claimed in claim 1 wherein said recirculation means includes air withdrawing means comprising air exit porting at the top of said oven cavity and forced air circulation means for withdrawing oven air through said porting.

4. Oven apparatus as claimed in claim 1 wherein the air channels are of generally triangular cross section and the heating channels are of trapezoidal cross section with the larger base confronting the oven cavity.

5. Oven apparatus as claimed in claim 4 wherein the channels are formed by a corrugated web member.

6. Oven apparatus as claimed in claim 1 including an arrangement of heating and air channels above and below the oven chamber.

7. Oven apparatus as claimed in claim 1 wherein said orifices are arranged in parallel longitudinally extending rows.

8. Oven apparatus comprising means defining an oven chamber having adjacent zones and including a pair of spaced apart walls, a heating system in each zone consisting of a plurality of side-by-side coplanar channels disposed exteriorly of said oven cavity adjacent at least one of said oven walls in heat exchange relation therewith, alternate ones of said channels being heating channels and the channels between the alternate ones air channels, means defining a plurality of orifices providing communication between the air channels and the oven chamber, and means for circulating air through said air channels and through said oven cavity to provide for convection heating of said oven cavity and means for circulating a heated gas through said heating channels to provide for radiant heating of said oven cavity, said orifices being arranged in longitudinally extending parallel side by side rows, the rows in each zone being staggered relative to one another.